United States Patent
Fukushi et al.

(10) Patent No.: US 7,379,284 B2
(45) Date of Patent: May 27, 2008

(54) SWITCHING CONTROL CIRCUIT AND SELF-EXCITED DC-DC CONVERTER

(75) Inventors: Iwao Fukushi, Gunma (JP); Tomoaki Nishi, Nagaoka (JP); Takashi Noma, Nagaokakyo (JP)

(73) Assignees: Sanyo Electric Co., Ltd., Osaka (JP); Murata Manufacturing Co., Ltd., Kyoto (JP)

( * ) Notice: Subject to any disclaimer, the term of this patent is extended or adjusted under 35 U.S.C. 154(b) by 20 days.

(21) Appl. No.: 11/426,273

(22) Filed: Jun. 23, 2006

(65) Prior Publication Data

US 2006/0290333 A1    Dec. 28, 2006

(30) Foreign Application Priority Data

Jun. 24, 2005    (JP)    ............... 2005-185340

(51) Int. Cl.
 H02H 3/00    (2006.01)
 G05F 1/00    (2006.01)

(52) U.S. Cl. ......................... 361/94; 323/287

(58) Field of Classification Search ................ 323/285, 323/287; 361/94
    See application file for complete search history.

(56) References Cited

U.S. PATENT DOCUMENTS 5,966,003 A * 10/1999 Takimoto et al. ........... 323/224
5,994,885 A * 11/1999 Wilcox et al. ............... 323/285
6,147,478 A * 11/2000 Skelton et al. .............. 323/288
2005/0116695 A1* 6/2005 Morioka ...................... 323/272

FOREIGN PATENT DOCUMENTS

JP    07-245874    9/1995
JP    2005-110369    4/2005

\* cited by examiner

*Primary Examiner*—Michael Sherry
*Assistant Examiner*—Tien Mai
(74) *Attorney, Agent, or Firm*—SoCal IP Law Group LLP; Steven C. Sereboff; John E. Gunther

(57) ABSTRACT

A self-excited DC-DC converter comprises a switching element that chops a direct-current input voltage; a smoothing circuit that smoothes the chopped voltage to generate a DC output voltage; a switching control signal generation circuit that generates a switching control signal for the on/off control of the switching element by comparing a feedback voltage of the output voltage and a comparison voltage; an output correction circuit that adjusts the comparison voltage according to an error between the feedback voltage and the reference voltage and, when the output current is in the overcurrent state, reduces the level of the comparison voltage; an overcurrent protection signal generation circuit that, when the output current is in an overcurrent state, generates an overcurrent protection signal for turning off the switching element regardless of the switching control signal; and a delay circuit that delays the overcurrent protection signal. Also, a switching control circuit is provided therein.

5 Claims, 8 Drawing Sheets

US 7,379,284 B2

SWITCHING CONTROL CIRCUIT AND SELF-EXCITED DC-DC CONVERTER

CROSS-REFERENCE TO RELATED APPLICATIONS

This application claims priority from Japanese Patent Application No. 2005-185340, filed Jun. 24, 2005, of which is herein incorporated by reference.

BACKGROUND OF THE INVENTION

1. Field of the Invention

The present invention relates to a switching control circuit and a self-excited DC-DC converter.

2. Description of the Related Art

A DC-DC converter is a local switching power source built into an electronic device and is classified broadly into an externally excited type and a self-excited type. The DC-DC converter has at least one switching element that chops a direct-current input voltage Vin and control ON/OFF of the switching element to chop the input voltage Vin. In this switching power source, the chopped input voltage Vin is smoothed by a LC smoothing circuit, etc., to acquire an output voltage Vout at a certain target level that is different from the level of the input voltage Vin. With such an arrangement, the DC-DC converter can supply a power supply voltage necessary for a load side circuit connected to the DC-DC converter.

FIG. 6 shows the configuration of a conventional externally excited DC-DC converter 300.

The externally excited DC-DC converter 300 is provided with NMOS transistors Q1, Q2 serially connected between a power supply line of an input voltage Vin and a ground line, and the NMOS transistors Q1, Q2 are turned on/off by a drive circuit 40 in a complementary manner. As a result, a rectangular-wave signal indicating H-level or L-level appears at the connecting point of the NMOS transistors Q1, Q2 and is supplied to a LC smoothing circuit constituted by a smoothing coil L and a capacitance element C1. In this way, an output voltage Vout is generated, which has been stepped down compared to the input voltage Vin and smoothed.

The output voltage Vout is divided by resistance elements R1, R2 for adjusting the target level to produce a voltage (=R2/(R1+R2)), which is returned to an error amplifier 100. The error amplifier 100 integrates and outputs an error between a divided voltage Vf which varies depending on the output voltage Vout and a reference voltage Vref. A PWM comparator 120 compares a triangular wave voltage output by a triangular wave oscillator 110 and the output of the error amplifier 100 to generate a PWM (Pulse Width Modulation) signal P that turns on/off the NMOS transistors Q1, Q2 via the drive circuit 40. In this case, the NMOS transistor Q1 is on during a period when the PWM signal P is at H-level (NMOS transistor Q2 is off) and is off during a period when the PWM signal P is at L-level (NMOS transistor Q2 is on).

It is assumed that the output voltage Vout of the externally excited DC-DC converter 300 becomes higher than a steady level because of disturbance or the like. In this case, since the divided voltage Vf follows the output voltage Vout and becomes higher, the error voltage (Vref−Vf) output from the error amplifier 100 is gradually reduced. As a result, an H-level pulse width is shortened in the PWM signal P output from the PWM comparator 120. Since the ON period of the NMOS transistor Q1 is shortened, the level of the output voltage Vout is lowered and the output voltage Vout is controlled in the direction of returning to the steady state. On the other hand, if the output voltage Vout becomes a level lower than the reference voltage Vref, although in an operation opposite to the above, the output voltage Vout is controlled in the direction of returning to the steady state likewise.

By the way, it is known that it is difficult to speed up the operation of the separately excited DC-DC converter 300 because the divided voltage Vf must go through the error amplifier 100 before the divided voltage Vf is used in the PWM comparator 120. Specifically, the error amplifier 100 with the resistance element R1 and the capacitance element Cr constitutes an integral circuit. Therefore, if the output voltage Vout rapidly changes, the error amplifier 100 cannot quickly output the output result corresponding to the rapid change. Therefore, the error amplifier 100 takes time to perform controls corresponding to the rapid change in the output voltage Vout.

Accordingly, a proposal has been made of a self-excited DC-DC converter having removed therefrom the error amplifier 100, which is an inhibiting factor of the fast control response, and the triangular wave oscillator 110. Since the fluctuations (i.e., ripple) of the output voltage Vout directly appear as changes in the ON/OFF periods of the switching element, the self-excited DC-DC converter has faster control responsiveness and is suitable for a power supply application that requires faster responsiveness to load fluctuations. This type of the self-excited DC-DC converter is generally referred to as "ripple converter" (see, e.g., Japanese Patent Application Laid-Open Publication No. 2005-110369).

FIG. 7 shows a typical configuration of a conventional ripple converter 310 (hereinafter, "ripple converter 310 of a first conventional example"). A difference from the externally excited DC-DC converter 300 shown in FIG. 6 is that a ripple comparator 10 and a delay circuit 30 are disposed instead of the error amplifier 100, the triangular wave oscillator 110, and the PWM comparator 120. The same reference numerals indicate the same components as in FIG. 6, which will not be described.

The ripple comparator 10 is embodied as a so-called differential comparator that has an inverting input terminal for applying a divided voltage Vf obtained by dividing a ripple-like output voltage Vout to, an non-inverting input terminal for applying a reference voltage Vref to be compared with the divided voltage Vf and corresponding to the target level of the output voltage Vout to, and an output terminal for outputting a switching control signal D that turns on/off the NMOS transistors Q1, Q2 via the drive circuit 40 depending on the level comparison result between the divided voltage Vf and the reference voltage Vref. With regard to a switching control signal D' generated by delaying the switching control signal D by the delay circuit 30, the NMOS transistor Q1 is on during the H-level period and the NMOS transistor Q2 is on during the L-level period.

The delay circuit 30 delays the switching control signal D by a predetermined delay time Td before the switching control signal D output from the ripple comparator 10 is supplied to the NMOS transistors Q1, Q2. Therefore, since the ON/OFF periods of the NMOS transistor Q1, Q2 change following the change in the delay time Td, it can be said that the delay circuit 30 is for setting the switching frequencies of the NMOS transistors Q1, Q2 to desired values. By the way, other than the delay time Td of the delay circuit 30, the ripple comparator 10 and the drive circuit 40 have delays and the NMOS transistors Q1, Q2 have switching delays. However, these delays are ignored in the following description based on the premise that these delays are extremely shorter than the delay time Td of the delay circuit 30.

FIG. 8 shows waveform diagrams of major signals of the ripple converter 310 of the first conventional example in the case of a step-down ratio of "1/2". The "step-down ratio of 1/2" is the case that the input voltage Vin of 10V is stepped down to the output voltage of 5V, for example, and each on-duty of the NMOS transistors Q1, Q2 is "1/2" in this case.

The ripple comparator 10 outputs the H-level switching control signal D when the divided voltage Vf does not exceed the reference voltage Vref and outputs the L-level switching control signal D when the divided voltage Vf exceeds the reference voltage Vref (see FIG. 8(*a*), (*b*)). The switching control signal D' delayed by the delay time Td is generated when the switching control signal D goes through the delay circuit 30 (see FIG. 8(*b*), (*c*)). The switching control signal D' is supplied to the NMOS transistors Q1, Q2.

Therefore, the NMOS transistor Q1 is not turned off (the NMOS transistor Q2 is not turned on) when the divided voltage Vf becomes higher than the reference voltage Vref, and the NMOS transistor Q1 is turned off (the NMOS transistor Q2 is turned on) when the delay time Td has elapsed after the divided voltage Vf becomes higher than the reference voltage Vref. Similarly, the NMOS transistor Q1 is turned on (the NMOS transistor Q2 is turned off) when the delay time Td has elapsed after the divided voltage Vf becomes lower than the reference voltage Vref (see FIG. 8(*a*), (*d*), (*e*)). As a result, the waveform of the divided voltage Vf is in the form of a triangular wave having the same slope of rising and falling with the on-duty of "1/2", and the average level (direct-current component) of the divided voltage Vr coincides with the reference voltage.

It is assumed that the output voltage Vout of the ripple converter 310 of the first conventional example becomes higher than a steady state because of disturbance or the like. In this case, since the divided voltage Vf becomes higher following the output voltage Vout, an H-level pulse width is shortened in the switching control signal D output from the ripple comparator 10. As a result, since the ON period of the NMOS transistor Q1 is shortened, the level of the output voltage Vout is lowered and the output voltage Vout is controlled in the direction of returning to the steady state. On the other hand, if the output voltage Vout becomes a level lower than the reference voltage Vref, although in an operation opposite to the above, the output voltage Vout is controlled in the direction of returning to the steady state likewise.

In the ripple converter 310 of the first conventional example, the following disadvantages are pointed out. FIG. 9 shows waveform diagrams of major signals of the ripple converter 310 of the first conventional example when the step-down ratio is smaller than "1/2". As shown in FIG. 9(*a*), if the step-down ratio is different from "1/2", the triangular wave of the divided voltage Vr has different slopes of rising and falling. The delay time Td of the delay circuit 30 is fixed. Therefore, a difference is generated between the reference voltage Vref applied to the ripple comparator 10 and the average level of the divided voltage Vf.

Describing specifically with numeric values, for example, for the ripple converter 310 of the first conventional example as shown in FIG. 7, the following are assumed: the variable range of the input voltage Vin is 7.5 V to 20 V; the target level of the output voltage Vout is 5 V; the resistance element R1 is 4 kΩ; the resistance element R2 is 1 kΩ; and the reference voltage Vref is 1 V.

When the input voltage Vin is 10 V, the divided voltage Vf shows a waveform with an on-duty of 1/2 (see FIG. 8(*a*)) because the step-down ratio=1/2, and the average level of the divided voltage Vf coincides with 1 V of the reference voltage Vref. Therefore, the output voltage Vout remains at 5 V.

On the other hand, when the input voltage Vin is 15 V, the divided voltage Vf has a narrower on-duty (see FIG. 9(*a*)) because the step step-down ratio=1/3, and the average level of the divided voltage Vf is somewhat higher than 1 V of the reference voltage Vref. For example, if the average level of the divided voltage Vf is 1.02 V, the output voltage Vout is 5.1V (=1.02 V×(4 kΩ+1 kΩ)/1 kΩ), and the output voltage Vout changes by 2%.

When the input voltage Vin is 7.5 V, the divided voltage Vf has a wider on-duty (inverse state of FIG. 9(*a*)) because the step step-down ratio=2/3, and the average level of the divided voltage Vf is somewhat lower than 1 V of the reference voltage Vref. For example, if the average level of the divided voltage Vf is 0.98 V, the output voltage Vout is 4.9V (=0.98 V×(4 kΩ+1 kΩ)/1 kΩ), and the output voltage Vout changes by 2%.

In this way, the ripple converter 310 of the first conventional example has a deviation between the reference voltage Vref and the average level of the divided voltage Vf, and this deviation causes the problem that when the input voltage Vin changes, the output voltage Vout changes, which is supposed to be constant. To solve the problem due to the deviation, another ripple converter 320 (hereinafter, "ripple converter 320 of a second conventional example") is proposed where an output correction circuit 60 shown in FIG. 10 has been introduced to the ripple converter 310 of the first conventional example shown in FIG. 7. The same reference numerals indicate the same components as in FIG. 7, which will not be described.

For example, the output correction circuit 60 comprises an error amplifier 61 that has an inverting input terminal for applying the divided voltage Vf to, an non-inverting input terminal for applying the reference voltage Vref to, and an output terminal for outputting an error integral voltage VE between the divided voltage Vf and the reference voltage Vref; and a capacitance element C2 connected to a signal line between the output terminal of the error amplifier 61 and the non-inverting input terminal of the ripple comparator 10.

That is, to make the average level of the divided voltage Vf match the reference voltage Vref, i.e., to eliminate the aforementioned deviation, the output correction circuit 60 amplifies a relative error of the divided voltage Vf with respect to the reference voltage Vref and outputs a current for charging and discharging the capacitance element C2 thereby generating the error integral voltage VE. The ripple comparator 10 uses the error integral voltage VE generated in the output correction circuit 60 as a comparison voltage that is a comparison target for the divided voltage Vf. As a result, the divided voltage Vf and the reference voltage Vref applied to the error amplifier 61 are imaginarily shorted and adjusted so that the average level of the divided voltage Vf coincides with the reference voltage Vref. For example, in the case of the aforementioned numeric value example, when the input voltage Vin is 15 V, the voltage applied to the non-inverting input terminal of the ripple comparator 10 is 0.98 V (=1/1.02 V), and when the input voltage Vin is 7.5 V, the voltage applied to the non-inverting input terminal of the ripple comparator 10 is 1.02 V (=1/0.98 V). In this way, the problem due to the aforementioned deviation can be solved.

By the way, regardless of whether the DC-DC converter is the externally excited type or the self-excited type, the components such as the NMOS transistors Q1, Q2 or a circuit on the load side may be damaged because its output current Iout exceeds a predetermined OCP (Over Current Protection) level for some reason. To prevent such an event, the DC-DC converter is usually provided with a mechanism for overcurrent protection (see, e.g., Japanese Patent Application Laid-Open Publication No. H07-245874).

FIG. 11 is a diagram for describing the configuration of a DC-DC converter with the overcurrent protection function.

An overcurrent state detection circuit 50 detects the output current Iout of the DC-DC converter and compares it with a predetermined threshold value used as a criterion for determining whether being in the overcurrent state or not and generates a state signal S indicating the comparison result.

If the state signal S generated by the overcurrent state detection circuit 50 indicates being in the overcurrent state, an overcurrent protection circuit 51 generates an overcurrent protection signal P to turn off the NMOS transistor Q1 (turn on the NMOS transistor Q2) through the drive circuit 40 to reduce the output current Iout and the level of the output voltage Vout. When the state signal S subsequently indicates being not in the overcurrent state, the overcurrent protection circuit 51 stops the overcurrent protecting operation (makes the overcurrent protection signal P invalid) and switches to the normal operation.

For example, if the overcurrent protection mechanism shown in FIG. 11 is simply provided in the ripple converter 310 of the first conventional example shown in FIG. 7 and the ripple converter 320 of the second conventional example shown in FIG. 10, the following problems will occur.

If the overcurrent protection mechanism is provided in the ripple converter 310 of the first conventional example, the NMOS transistor Q1 is turned off (the NMOS transistor Q2 is turned on) at OCP points where a voltage changing according to the output current Iout, i.e., an output direct-current detection voltage Vd exceeds a reference voltage VOCP corresponding to the overcurrent state, and the level of the output direct-current detection voltage Vd decreases. As a result, the output direct-current detection voltage Vd becomes lower than the reference voltage VOCP, and the overcurrent protection circuit 51 stops the overcurrent protecting operation and switches to the normal operation. Since the level of the output voltage Vout has decreased, the ripple converter 310 of the first conventional example is controlled in the direction of turning on the NMOS transistor Q1 (turning off the NMOS transistor Q2). Therefore, the output direct-current detection voltage Vd becomes higher than the reference voltage VOCP again.

In this way, as shown in FIG. 12, the ripple converter 310 of the first conventional example repeats a series of operations of causing the output direct-current detection voltage Vd to become higher than the reference voltage VOCP, turning off the NMOS transistor Q1, and causing the output direct-current detection voltage Vd to become lower than the reference voltage VOCP, at a high speed. Therefore, the switching frequencies of the NMOS transistors Q1, Q2 become very high, which increases the switching loss, and the components of the ripple converter 310 of the first conventional example may be damaged.

If the overcurrent protection arrangement is provided in the ripple converter 320 of the second conventional example, as shown in FIG. 13, when the output current Iout switches from the steady state to the overcurrent state (at time T1 of FIG. 13), the level of the output voltage Vout is reduced by the overcurrent protection mechanism (see FIG. 13(a), (b)). Since the level of the output voltage Vout is reduced, the level of the divided voltage Vf is also reduced and thus the error between the two inputs for the error amplifier 61 is enlarged. Hence the level of the error integral voltage VE is increased (see FIG. 13(b), (c)). That is, the level of the reference voltage Vref applied to the ripple comparator 10 is increased.

When the output current Iout returns from the overcurrent state to the steady state in such a condition (at time T2 of FIG. 13), the error integral voltage VE maintains its level higher than the steady state until the divided voltage Vf becomes approximately equal to the reference voltage Vref. Since the responsiveness at high-frequency of the output correction circuit 60 is lowered, it takes time for the level of the error integral voltage VE to decrease even after the divided voltage Vf becomes approximately equal to the reference voltage Vref (see FIG. 13(b), (c)). Therefore, there is the problem that the overshoot of the output voltage Vout occurs after the overcurrent protection is released.

SUMMARY OF THE INVENTION

In order to solve the above problem, according to a major aspect of the present invention there is provided a switching control circuit that is provided in a self-excited DC-DC converter chopping a direct-current input voltage by turning on/off a switching element and then smoothing the chopped voltage with a smoothing circuit to generate an output voltage of a target level that is different from the level of the input voltage. The switching control circuit comprises a switching control signal generation circuit that detects a change in ripples of the output voltage and generates a switching control signal for the on/off control of the switching element to make the output voltage follow the target level; an overcurrent protection signal generation circuit that detects the output current of the self-excited DC-DC converter and, when it is detected that the output current is in an overcurrent state where being equal to a predetermined current or greater, generates an overcurrent protection signal for turning off the switching element to make the output current less than the predetermined current regardless of the switching control signal; and a delay circuit that delays the overcurrent protection signal.

In order to solve the above problem, according to another major aspect of the present invention there is provided a switching control circuit that is provided in a self-excited DC-DC converter chopping a direct-current input voltage by turning on/off a switching element and then smoothing the chopped voltage with a smoothing circuit to generate an output voltage of a target level that is different from the level of the input voltage. The switching control circuit comprises a switching control signal generation circuit that detects a change in ripples of the output voltage and generates a switching control signal for the on/off control of the switching element by comparing a feedback voltage obtained by feeding back the output voltage and a comparison voltage as a comparison target to make the output voltage follow the target level; an overcurrent protection signal generation circuit that detects the output current of the self-excited DC-DC converter and, when it is detected that the output current is in an overcurrent state where being equal to a predetermined current or greater, generates an overcurrent protection signal for turning off the switching element to make the output current less than the predetermined current regardless of the switching control signal; and an output correction circuit that adjusts the comparison voltage according to a relative error of the feedback voltage with respect to the reference voltage to make the average level of the feedback voltage coincide with the reference voltage corresponding to the target level and, when the overcurrent protection signal generation circuit detects that the output current is in the overcurrent state, reduces the level of the comparison voltage.

The above and other features of the present invention will become more apparent from the following detailed description of this specification when taken in conjunction with the accompanying drawings.

BRIEF DESCRIPTION OF THE DRAWINGS

To understand the present invention and the advantages thereof more thoroughly, the following description should be referenced along with the accompanying drawings, in which.

DETAILED DESCRIPTION OF THE INVENTION

From the contents of the description and the accompanying drawings, at least the following details will be apparent.

<First Implementation>

==Configuration of Ripple Converter Using Switching Control Circuit==

Figure 1:
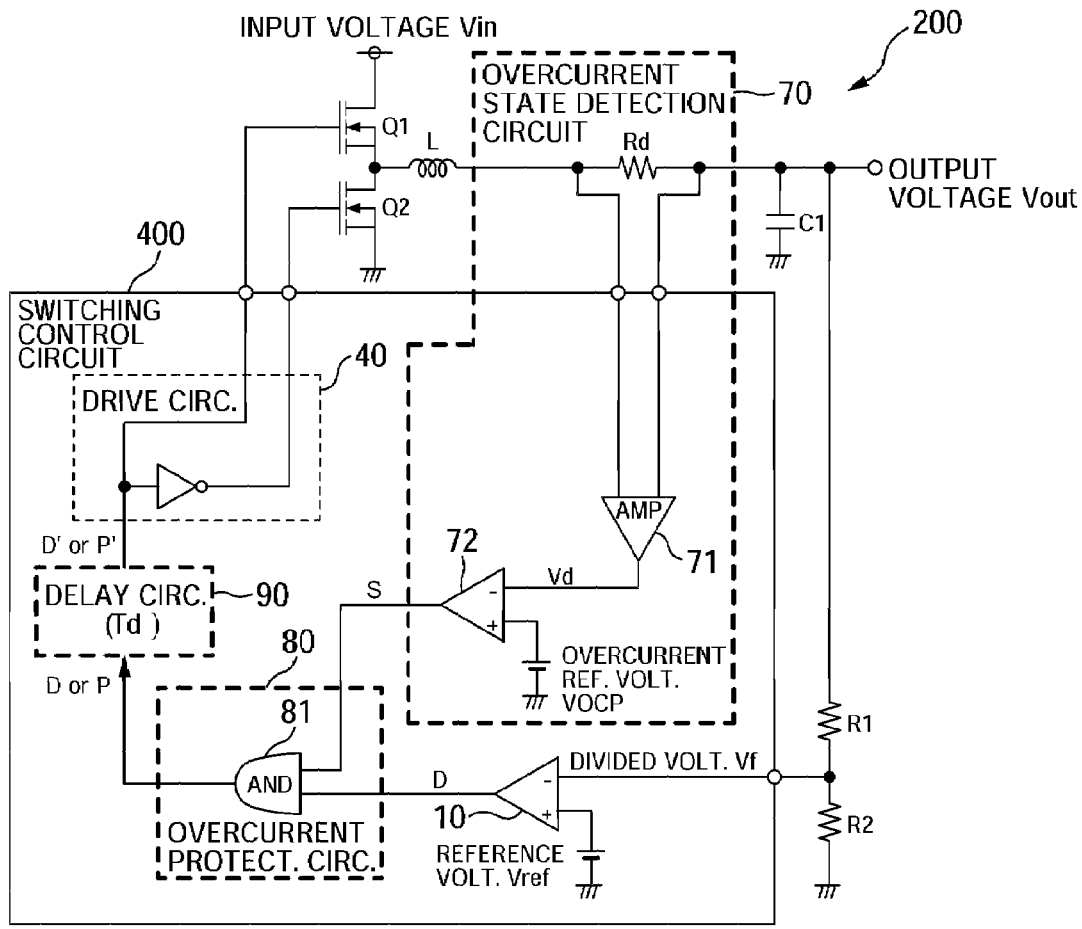
FIG. 1 shows the configuration of a ripple converter according to a first implementation of the present invention.
Figure 2:
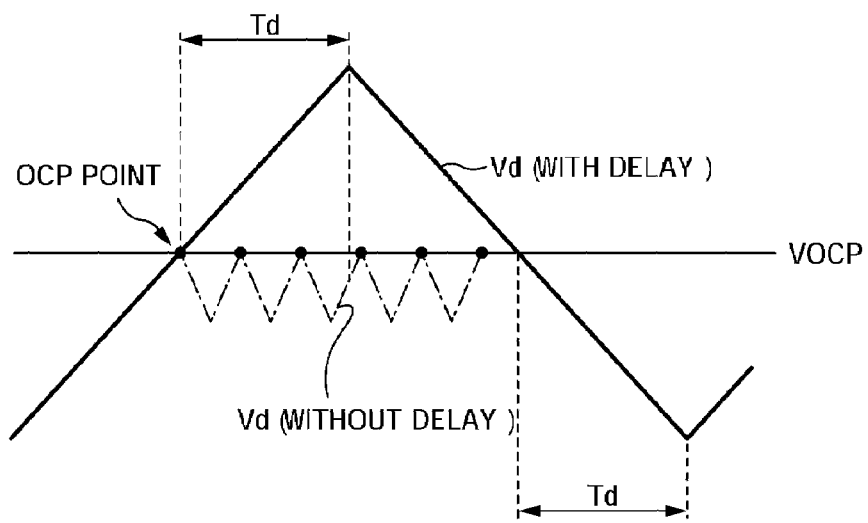
FIG. 2 shows a conceptual waveform of an output voltage Vout of the ripple converter before and after the overcurrent protection according to the first implementation of the present invention.

FIG. 1 shows a ripple converter 200 having external components connected to a switching control circuit 400 that is an integrated circuit provided with an overcurrent protection mechanism according to a first implementation of the present invention.

In this implementation, the external components of the switching control circuit 400 are a switching element that is a serial connection body of NMOS transistors Q1, Q2, a LC smoothing circuit constituted by a smoothing coil L and a capacitance element C1, a dividing circuit that is a serial connection body of resistance elements R1, R2, and a resistance element Rd for detecting an output current Iout corresponding to an output voltage Vout. In some implementations, the external components may be built into the switching control circuit 400, other than the smoothing circuit, which is generally difficult to be integrated.

The NMOS transistors Q1, Q2 are one implementation of a "switching element" according to claims of this application. The NMOS transistors Q1, Q2 are disposed and serially connected between a power supply line of a direct-current input voltage Vin and a ground line. The NMOS transistors Q1, Q2 are turned on/off by a drive circuit 40 in a complementary manner, and the chopped input voltage, i.e., a rectangular-wave signal appears at the connecting point of the NMOS transistors Q1, Q2. The present invention may employ not only the NMOS transistors Q1, Q2 but also other elements that can perform similar switching operations.

The LC smoothing circuit constituted by the smoothing coil L and the capacitance element C1 is one implementation of a smoothing circuit according to claims of this application. The LC smoothing circuit receives the aforementioned rectangular-wave signal input and generates an output voltage Vout, which is stepped down and smoothed as compared to the input voltage Vin.

The dividing circuit, a serial connection body of the resistance elements R1, R2, divides the output voltage Vout to a divided voltage Vf ($=R2/(R1+R2) \times Vout$) by a division ratio ($=R2/(R1+R2)$) determined by the resistance values of the resistance elements R1, R2. That is, an intended direct-current voltage level of the output voltage Vout (hereinafter, "target level") is adjusted by changing the resistance values of the resistance elements R1, R2.

The ripple comparator 10 is one implementation of a switching signal generation circuit according to claims of this application. The ripple comparator 10 is a so-called differential comparator that has: an inverting input terminal for applying a divided voltage Vf (a feedback voltage according to claims of this application) to, which is a feedback voltage of the output voltage Vout from the LC smoothing circuit and which reflects the change in the ripple of the output voltage Vout; an non-inverting input terminal for applying a reference voltage Vref (a reference voltage or comparison voltage according to claims of this application) corresponding to the target level of the output voltage Vout; and an output terminal that outputs a switching control signal D for controlling the turning on/off of the NMOS transistors Q1, Q2 through the drive circuit 40 depending on the level comparison result between the divided voltage Vf and the reference voltage Vref to make the ripple of the output voltage follow the target level. When the level of the divided voltage Vf is lower than the reference voltage Vref and when the switching control signal D is H-level (one level), the NMOS transistor Q1 is turned on (NMOS transistor Q2 is turned off). Conversely, when the level of the divided voltage Vf is higher than the reference voltage Vref and when the switching control signal D is L-level (the other level), the NMOS transistor Q1 is turned off (NMOS transistor Q2 is turned on).

An overcurrent state detection circuit 70 and an overcurrent state protection circuit 80 are one implementation of an overcurrent protection signal generation circuit according to claims of this application.

The overcurrent state detection circuit 70 detects an output current Iout corresponding to the output voltage Vout and generates a state signal S indicating whether the detected output current Iout is in the overcurrent state or not. For example, the overcurrent state detection circuit 70 is constituted by: a resistance element Rd disposed between the connecting point of the NMOS transistors Q1, Q2 and an output terminal of the output voltage Vout; and an OCP comparator 72 that compares an output current detection voltage Vd produced by an OCP amplifier 71 amplifying an electric potential difference occurring across the resistance element Rd when the output current Iout flows through the resistance element Rd and a reference voltage VOCP corresponding to a current used as a criterion of the overcurrent state to output the comparison result as a state signal S.

The OCP comparator 72 is a differential comparator that has an inverting input terminal for applying the detection voltage Vd output from the OCP amplifier 71 to, an non-inverting input terminal for applying a reference voltage VOCP to, and an output terminal that outputs the state signal S indicating the comparison result of the detection voltage and the overcurrent reference voltage. In the case of this configuration, the state signal S is H-level (one level) when the detection voltage Vd is less than the reference voltage VOCP and L-level (the other level) when the detection voltage Vd is equal to the reference voltage VOCP or greater. Therefore, if the state signal S is H-level, it means that the non-overcurrent state is detected, and if the state signal S is L-level, it means that the overcurrent state is detected.

If the state signal S generated by the overcurrent state detection circuit 70 indicates being in the overcurrent state (L-level), the overcurrent protection circuit 80 generates an overcurrent protection signal P for turning off the NMOS transistor Q1 (turning on the NMOS transistor Q2) through the drive circuit 40 to reduce the output current Iout and the level of the output voltage Vout. When the state signal S subsequently indicates being not in the overcurrent state (H-level), the overcurrent protection circuit 51 stops the overcurrent protecting operation (makes the overcurrent protection signal P invalid) and switches to the normal operation that uses the switching control signal D generated by the ripple comparator 10.

That is, the overcurrent protection circuit 80 has inputted thereto the state signal S output from the overcurrent state detection circuit 70 and the switching control signal D output from the ripple comparator 10. The overcurrent protection circuit 80 outputs the switching control signal D when the state signal S indicates being not in the overcurrent state (H-level) and outputs the overcurrent protection signal P when the state signal S indicates being in the overcurrent state (L-level).

The overcurrent protection circuit 80 can be constituted by a simple AND element 81 on the premise that the ripple comparator 10 and the overcurrent state detection circuit 70 have the above configurations.

That is, if the output current Iout is not in the overcurrent state, the detection voltage Vd applied to the inverting input terminal of the OCP comparator 72 is lower than the reference voltage VOCP applied to the non-inverting input terminal thereof. In this case, the OCP comparator 72 generates the H-level state signal S indicating being not in the overcurrent state. Therefore, since the state signal is always at H-level in the steady state, the AND element 81 outputs the switching control signal D from the ripple comparator 10.

On the other hand, if the output current Iout is in the overcurrent state, the overcurrent protection is activated that reduces the output voltage Vout to a prescribed voltage or lower via the overcurrent protection signal P generated by the overcurrent state protection circuit 80. In this case, the divided voltage Vf applied to the inverting input terminal of the ripple comparator 10 is lower than the reference voltage Vref applied to the non-inverting input terminal thereof. Therefore, in the case of the overcurrent state, since the ripple comparator 10 always outputs the H-level switching control signal D, the AND element 81 outputs the state signal S from the overcurrent state detection circuit 70. In the case of the overcurrent state, the state signal S is always at L-level and can be used as the overcurrent protection signal P for turning off the NMOS transistor Q1 (turning on the NMOS transistor Q2).

A delay circuit 90 delays the switching control signal D or the overcurrent protection signal P (L-level state signal S) output from the overcurrent state protection circuit 80 by a predetermined delay time Td. The delayed signal D' or P' delayed by the delay circuit 90 is supplied to the NMOS transistors Q1, Q2 through the drive circuit 40.

Specifically, if being not in the overcurrent state, the delay circuit 90 delays the switching control signal D by a predetermined delay time Td before the switching control signal D is supplied to the NMOS transistors Q1, Q2. Since the ON/OFF periods of the NMOS transistor Q1, Q2 change accordingly as the delay time Td is varied, the delaying of the switching control signal D by the predetermined delay time Td means that the switching frequency of the NMOS transistors Q1, Q2 is set to a desired value. In the case of the overcurrent state, the delay circuit 90 according to the present invention delays the overcurrent protection signal P by the delay time Td before the overcurrent protection signal P is supplied to the NMOS transistors Q1, Q2 for the reason described later.

==Operation of Ripple Converter==

Description will be made of the operation of the ripple converter 200 when the overcurrent protection control is not performed.

The NMOS transistor Q1 is not turned off and the NMOS transistor Q2 is not turned on when the divided voltage Vf exceeds the reference voltage Vref, and the NMOS transistor Q1 is turned off and the NMOS transistor Q2 is turned on when the delay time Td has elapsed after the divided voltage Vf exceeds the reference voltage Vref. Similarly, the NMOS transistor Q1 is turned on and the NMOS transistor Q2 is turned off when the delay time Td has elapsed after the divided voltage Vf becomes lower than the reference voltage Vref.

It is assumed that the output voltage Vout becomes a level higher than a steady state because of disturbance or the like. In this case, since the divided voltage Vf follows the output voltage Vout and becomes higher, an H-level pulse width is shortened in the switching control signal D output from the ripple comparator 10. As a result, since the ON period of the NMOS transistor Q1 is shortened, the level of the output voltage Vout is lowered and the output voltage Vout is controlled in the direction of returning to the steady state. On the other hand, if the divided voltage Vf becomes a level lower than the reference voltage Vref, although in an operation opposite to the above, the output voltage Vout is controlled in the direction of returning to the steady state likewise.

Description will then be made of the operation of the ripple converter 200 when the overcurrent protection control is performed.

The overcurrent protection is not activated that turns off the NMOS transistor Q1 (turns on the NMOS transistor Q2) at the OCP point where the output current detection voltage Vd exceeds the reference voltage VOCP used as the criterion of the overcurrent state. When the delay time Td has elapsed after the OCP point, the overcurrent protection signal P is supplied to the NMOS transistors Q1, Q2, and the overcurrent protection is activated finally. As such, the switching frequency of the NMOS transistors Q1, Q2 is constrained to a low level by delaying the overcurrent protection signal P by the delay time Td before supplying to the NMOS transistors Q1, Q2. Therefore, the event that increases the switching loss as occurs in the first conventional example can be avoided.

In another implementation, different delay circuits may delay the overcurrent protection signal P output from the overcurrent state detection circuit 70 (which acts also as the overcurrent state protection circuit 80 in this case) and the switching control signal D output from the ripple comparator 10 respectively. However, in this implementation, the configuration of the switching circuit 400 is simplified by using the delay circuit 30, which is originally for delaying the output of the ripple comparator 10 in the ripple converter of the first conventional example, as the delay circuit 90.

<Second Implementation>
==Configuration of Ripple Converter==

Figure 3:
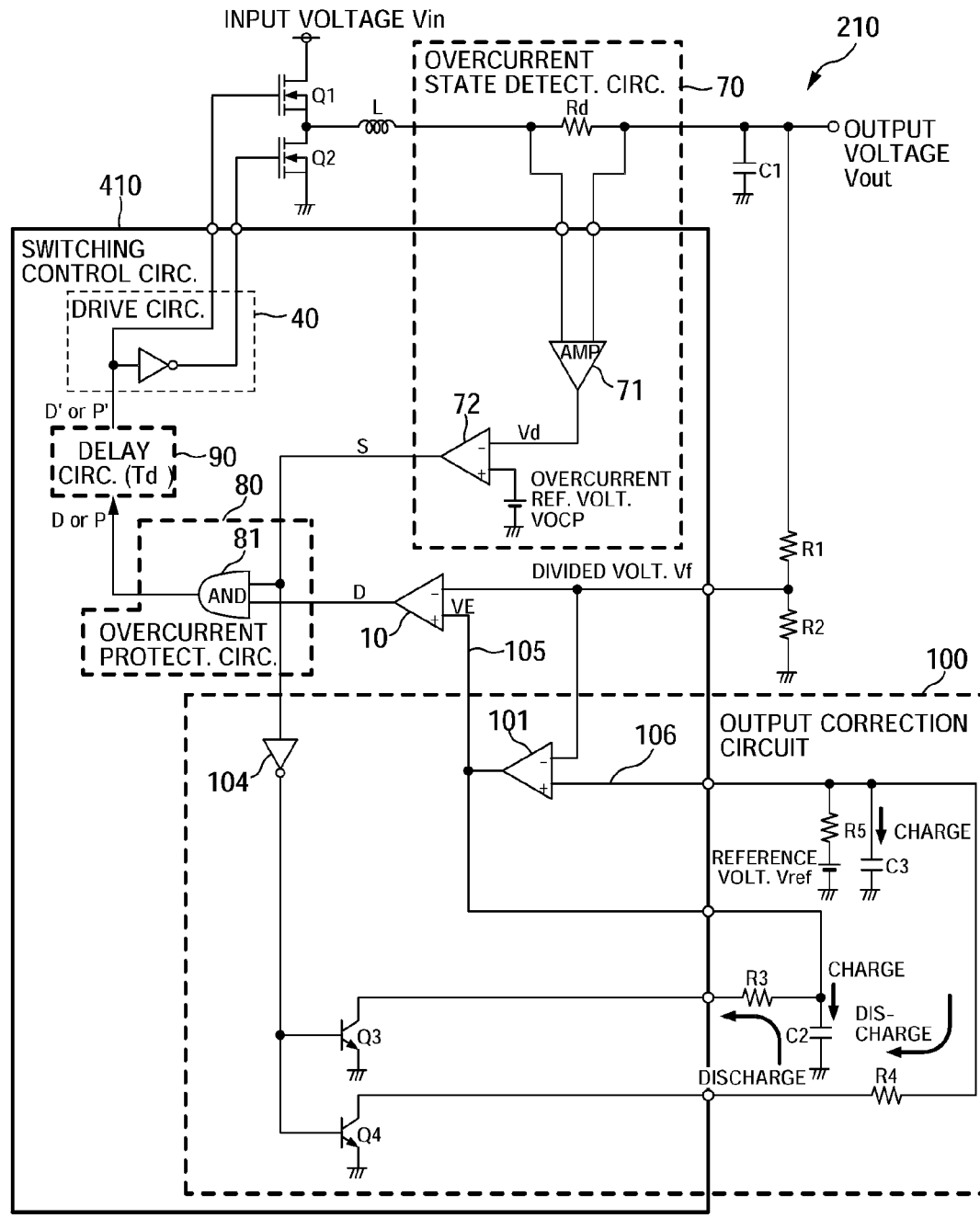
FIG. 3 shows the configuration of a ripple converter according to a second implementation of the present invention.

FIG. 3 shows a ripple converter 210 having external components connected to a switching control circuit 410 that is an integrated circuit provided with an overcurrent protection mechanism according to a second implementation of the present invention.

In this implementation, the external components of the switching control circuit 410 are a switching element that is a serial connection body of NMOS transistors Q1, Q2, a LC smoothing circuit constituted by a smoothing coil L and a capacitance element C1, a dividing circuit that is a serial connection body of resistance elements R1, R2, a resistance element Rd for detecting the output current Iout corresponding to the output voltage Vout, resistance elements R3 to R5 for an output correction circuit 100, capacitance elements C2, C3, and a power source of the reference voltage Vref. In another implementation, the external components may be built into the switching control circuit 410, other than the smoothing circuit and the capacitance elements C2, C3 which are generally difficult to be integrated.

The ripple converter 210 according to the second implementation of the present invention is difference from the ripple converter 200 according to the first implementation of the present invention in that the output correction circuit 100 is provided.

The output correction circuit 100 has a current-output type error amplifier 101 that includes an inverting input terminal for applying the divided voltage Vf to, an non-inverting input terminal for applying the reference voltage Vref to, and an output terminal for outputting a current obtained by amplifying a relative error in the divided voltage Vf with respect to the reference voltage Vref. The capacitance element C2 (a first capacitance element according to claims of this application) is connected to a signal line 105 (a first signal line according to claims of this application) between the output terminal of the error amplifier 101 and the non-inverting input terminal of the ripple comparator 10, and the capacitance element C2 is charged and discharged by the error current output from the error amplifier 101 thereby generating the error integral voltage VE. The error integral voltage VE deviates from the reference voltage Vref by a voltage by which the average level of the divided voltage Vf is offset depending on the duty. The error integral voltage VE is used as a voltage compared with the divided voltage Vf (hereinafter, "comparison voltage"), which is applied to the non-inverting input terminal of the ripple comparator 10.

As a result, in the ripple comparator 10, the comparison voltage to be compared with the divided voltage Vf is adjusted according to the error integral voltage VE, and the control is performed such that the levels of the divided voltage Vf and the comparison voltage are made equal. The divided voltage Vf and the reference voltage Vref applied to the error amplifier 101 are imaginarily shorted; the comparison voltage of the ripple comparator 10 becomes approximately the same level as the reference voltage Vref; and the average level of the divided voltage Vf is corrected to the reference voltage Vref. By such correction, the output voltage coincides with the target level, and the overall control of the ripple converter 210 is stabilized.

The output correction circuit 100 is also provided with a mechanism for reducing the level of the comparison voltage applied to the non-inverting input terminal of the ripple comparator 10 when the state signal S supplied from the overcurrent state detection circuit 70 indicates being in the overcurrent state (L-level). This mechanism for reducing the level of the comparison voltage of the ripple comparator 10 can be realized as a mechanism that reduces the level of the signal line 105 of the error integral voltage VE connecting between the output terminal of the correction circuit 100 and the non-inverting input terminal of the ripple comparator 10 when the state signal S supplied from the overcurrent state detection circuit 70 indicates being in the overcurrent state (L-level).

Specifically, the output correction circuit 100 is provided with a charging/discharging circuit that charges the capacitance element C2 according to the error current output from the error amplifier 101 if the state signal S indicates being not in the overcurrent state (H-level) and charges and discharges the capacitance element C2 if the state signal S indicates being in the overcurrent state (L-level). The charging/discharging circuit can be constituted by serially connecting a resistance element R3 (a first resistance element according to claims of this application) for adjusting the discharging speed of the capacitance element C2 and an NPN bipolar transistor Q3 (a first switching element according to claims of this application) that switches on/off according to the state signal S supplied from the overcurrent state detection circuit 70 via a NOT element 104 between the signal line 105 of the error integral voltage VE and the ground line. In other words, the charging/discharging circuit is constituted by connecting a series body of the resistance element R3 and the NPN bipolar transistor Q3 in parallel with the capacitance element C2.

In this case, if the state signal S indicates being not in the overcurrent state (H-level), the NPN bipolar transistor Q3 is turned off because the base electrode is supplied with L-level and, as a result, the capacitance element C2 is charged according to the error current output from the error amplifier 101. The level of the signal line 105 of the error integral voltage VE is maintained by the charging. On the other hand, if the state signal S indicates being in the overcurrent state (L-level), the NPN bipolar transistor Q3 is turned on because the base electrode is supplied with H-level; as a result, the electric charge of the capacitance element C2 is discharged through the resistance element R3 and the NPN bipolar transistor Q3; and the level of the signal line 105 of the error integral voltage VE decreases.

Figure 4:
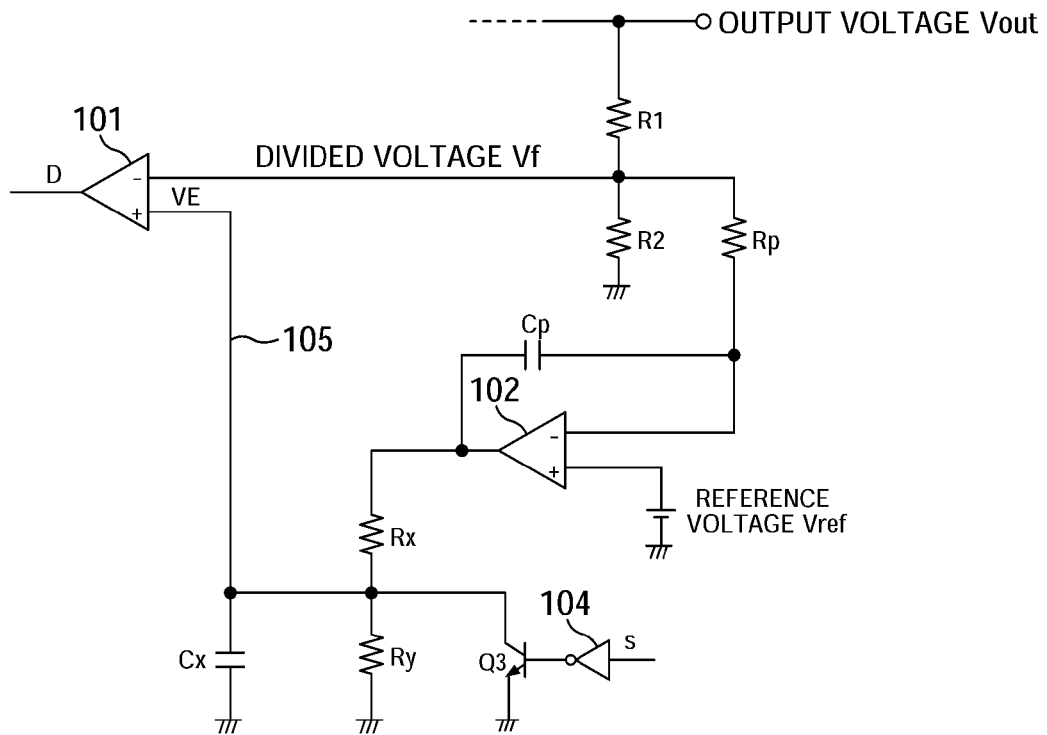
FIG. 4 shows the configuration of an output correction circuit according to the second implementation that is realized by a voltage-output type error amplifier.

The output correction circuit 100 is not limited to using the current-output type error amplifier 101 shown in FIG. 3 and may employ a voltage-output type error amplifier 102 shown in FIG. 4. In this case, as shown in FIG. 4, by disposing the capacitance element Cp on the negative feedback path of the error amplifier 102 and serially connecting a resistance element Rp to the capacitance element Cp, the error amplifier 102 forms an integral circuit that generates and outputs an integral voltage indicating the integral of the error between the divided voltage Vf and the reference voltage Vref. The integral voltage output from the error amplifier 102 is divided by a dividing circuit that is a serial connection body of resistance elements Rx, Ry to produce the error integral voltage VE to be applied to the non-inverting input terminal of the ripple comparator 10.

The collector electrode of the above-mentioned NPN bipolar transistor Q3 is connected to the connecting portion of the resistance elements Rx, Ry. If the state signal S indicates being in the overcurrent state (L-level), the NPN bipolar transistor Q3 is turned on because the base electrode is supplied with H-level. Although the level of the integral voltage output form the error amplifier 102 becomes higher, the divided circuit constituted by the resistance elements Rx, Ry does not functions because the resistance element Ry is short-circuited, and the level of the error integral voltage VE applied to the non-inverting input of the ripple comparator 10 decreases.

In the output correction circuit 100, another mechanism for reducing the level of the comparison voltage of the ripple comparator 10 can be realized as a mechanism for reducing the level of a signal line 106 (a second signal line) through which the reference voltage Vref is applied to the non-inverting input terminal of the error amplifier 101 when the state signal S supplied from the overcurrent state detection circuit 70 indicates being in the overcurrent state (L-level). That is, by reducing the level of the signal line 106, the error integral voltage VE of the error amplifier 101, i.e., the comparison voltage applied to the non-inverting input terminal of the ripple comparator 10 decreases in level.

Specifically, the output correction circuit 100 is provided with a capacitance element C3 (a second capacitance element according to claims of the application) connected to the signal line 106 of the reference voltage Vref, and a charging/discharging circuit that charges the capacitance element C3 up to the reference voltage Vref if the state signal S indicates being not in the overcurrent state (H-level) and discharges the capacitance element C3 if the state signal S indicates being in the overcurrent state (L-level). The charging/discharging circuit can be constituted by serially connecting a resistance element R4 (a second resistance element according to claims of this application) for adjusting the discharging speed of the capacitance element C3 connected to the signal line 106 of the reference voltage Vref and an NPN bipolar transistor Q4 (a second switching element according to claims of this application) that switches on/off according to the state signal S supplied from the overcurrent state detection circuit 70 via the NOT element 104. In other words, the charging/discharging circuit is constituted by connecting a series body of the resistance element R4 and the NPN bipolar transistor Q4 in parallel with the capacitance element C3. A resistance element R5 connected in series to the power source of the reference voltage Vref and in parallel with the capacitance element C3 is for adjusting the charging speed of the capacitance element C3.

In this case, if the state signal S indicates being not in the overcurrent state (H-level), the NPN bipolar transistor Q4 is turned off because the base electrode is supplied with L-level and, as a result, the capacitance element C3 is charged depending on the reference voltage Vref. The level of the signal line 106 of the reference voltage Vref is maintained. On the other hand, if the state signal S indicates being in the overcurrent state (L-level), the NPN bipolar transistor Q4 is turned on because the base electrode is supplied with H-level; as a result, the electric charge of the capacitance element C3 is discharged through the resistance element R4 and the NPN bipolar transistor Q4; and the level of the signal line 106 of the reference voltage Vref is reduced.

Further, the output correction circuit 100 is preferable because the level of the comparison voltage of the ripple comparator 10 can be reduced more reliably by providing both the mechanism (the resistance element R3, the NPN bipolar transistor Q3) for directly reducing the level of the comparison voltage (error integral voltage VE in this implementation) of the ripple comparator 10 and the mechanism (the resistance elements R4, R5, the NPN bipolar transistor Q4) for indirectly reducing the level of the comparison voltage of the ripple comparator 10 as shown in FIG. 3. However, the purpose of reducing the level of the comparison voltage of the ripple comparator 10 can be achieved only by providing either of them of the above-mentioned two mechanisms.

==Operation of Ripple Converter==

Description will be made of the operation of the ripple converter 210 with reference to FIG. 5.

When the output current Iout is changed from the steady state to the overcurrent state (see time T1 of FIG. 5A), the overcurrent state detection circuit 70 generates the L-level state signal S indicating that the detected output current Iout is in the overcurrent state. The overcurrent state protection circuit 80 supplies the NMOS transistors Q1, Q2 through the delay circuit 90 and the drive circuit 40 with the L-level state signal S as the overcurrent protection signal P for turning off the NMOS transistor Q1 and turning on the NMOS transistor Q2.

In the output correction circuit 100, since the L-level state signal S is supplied from the overcurrent state detection circuit 70, the electric charged in the capacitance elements C2, C3 is discharged. That is, the output correction circuit 100 preliminarily reduces the levels of the signal line 105 of the error integral voltage VE and of the signal line 106 of the reference voltage Vref before the overcurrent protection is subsequently released.

As a result, after the delay time Td has elapsed, the overcurrent protection signal P is supplied to the NMOS transistors Q1, Q2; the level of the output voltage Vout is reduced (see FIG. 5(b)); and the level of the divided voltage Vf is also reduced. As described above, since the overcurrent protection signal P is delayed by the delay circuit 90 and is then supplied to the NMOS transistors Q1, Q2, there is no possibility that the steady state and the overcurrent state of the output voltage may be repeated at a high speed to cause the switching frequency of the NMOS transistors Q1, Q2 to become high.

When the output current Iout is returned from the overcurrent state to the steady state in such a condition (see time T2 of FIG. 5(a)), the overcurrent state detection circuit 70 generates the H-level state signal S indicating that the detected output current Iout is not in the overcurrent state. In response to the H-level state signal S, the overcurrent state protection circuit 80 makes the overcurrent protection signal P invalid to release the overcurrent protection.

In the output correction circuit 100, since the L-level state signal S is supplied from the overcurrent state detection circuit 70, the capacitance elements C2, C3 are charged.

Figure 5:
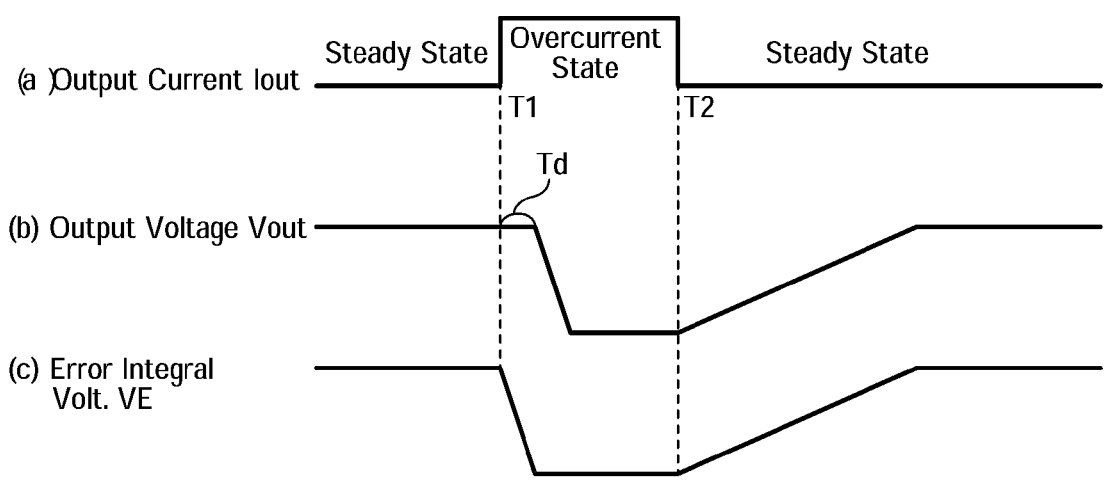
FIG. 5 shows conceptual waveforms of major signals of the ripple converter before and after the overcurrent protection according to the second implementation of the present invention.
Figure 6:
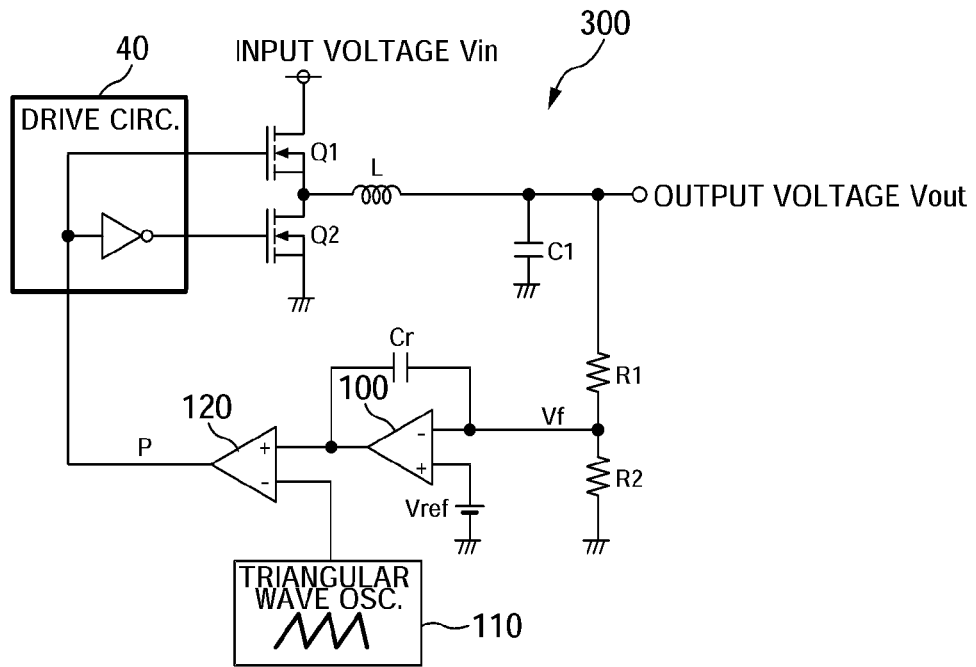
FIG. 6 shows the configuration of a conventional externally excited DC-DC converter.
Figure 7:
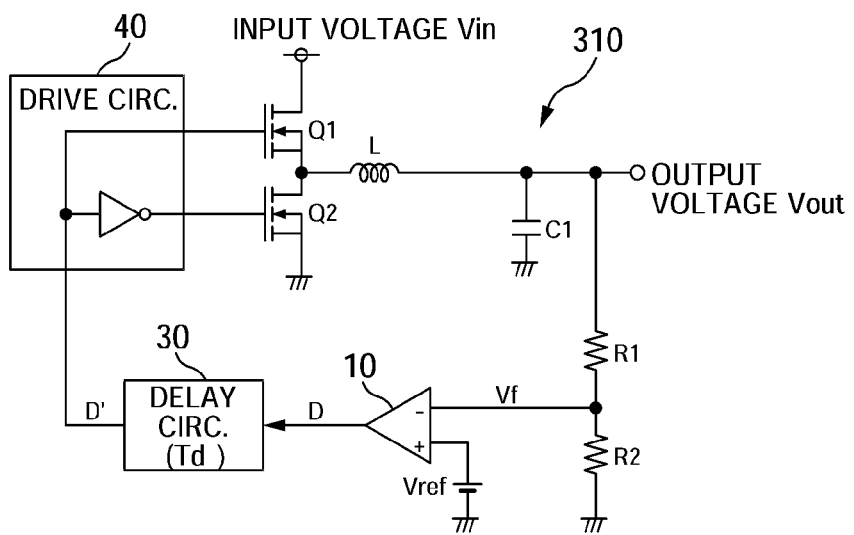
FIG. 7 shows the configuration of a ripple converter of a first conventional example.
Figure 8:
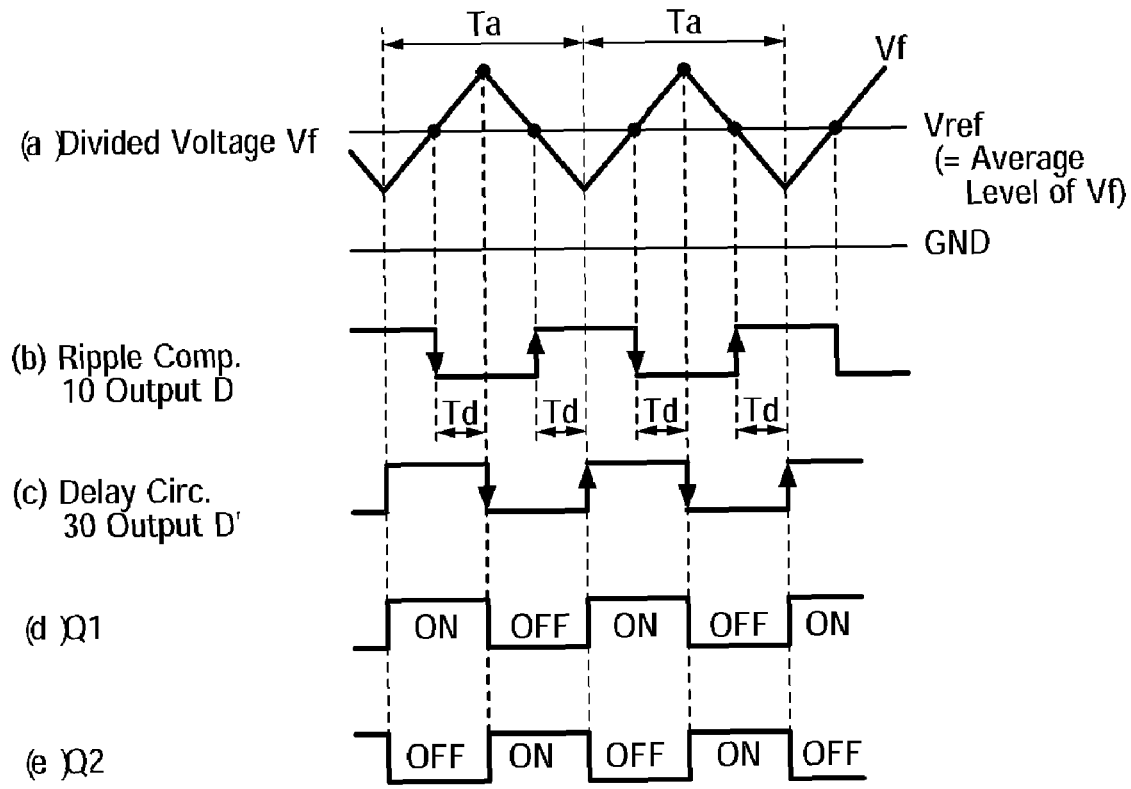
FIG. 8 shows waveforms of major signals of the ripple converter of the first conventional example in the case of the step-down ratio of 1/2.
Figure 9:
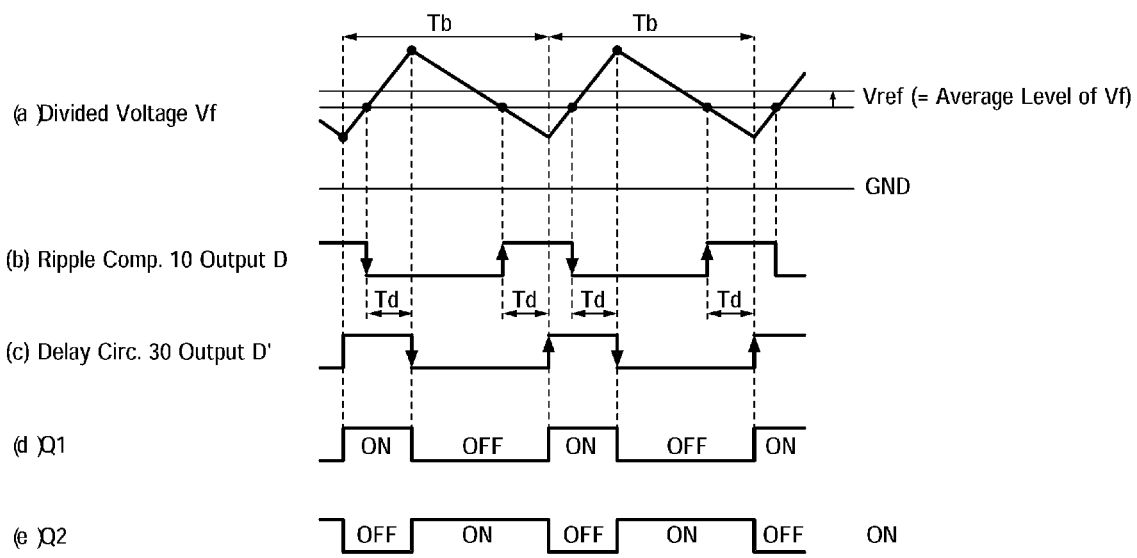
FIG. 9 shows waveforms of major signals of the ripple converter of the first conventional example when the step-down ratio is smaller than 1/2.
Figure 10:
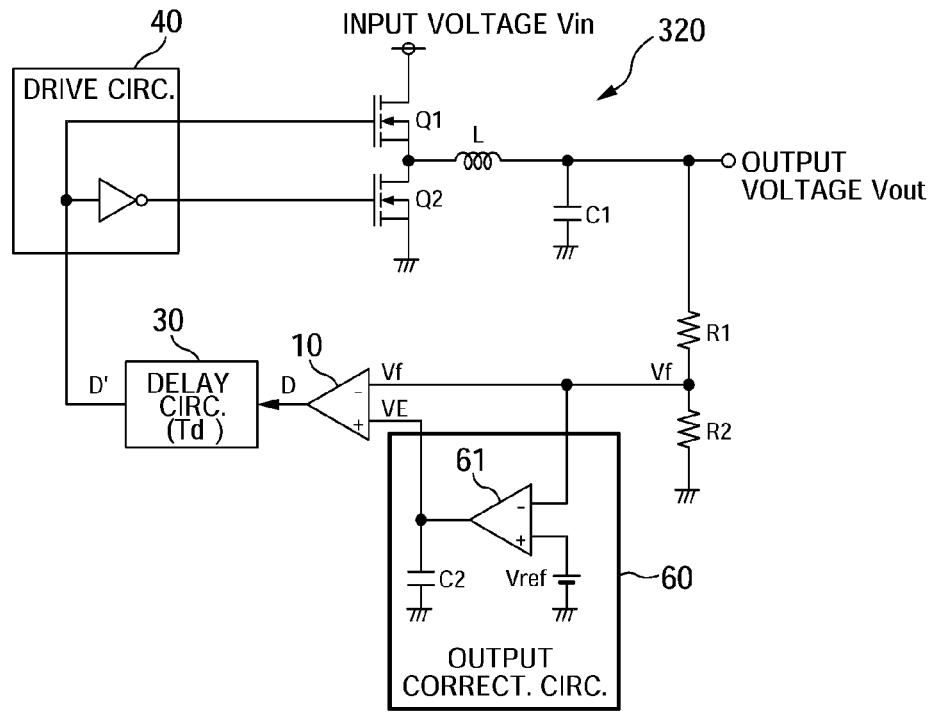
FIG. 10 shows the configuration of a ripple converter of a second conventional example.
Figure 11:
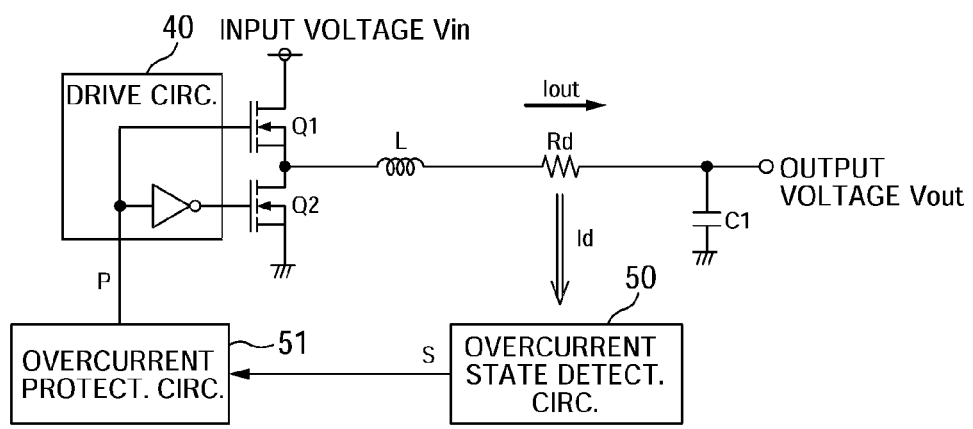
FIG. 11 shows a mechanism for realizing a conventional overcurrent protection function.
Figure 12:
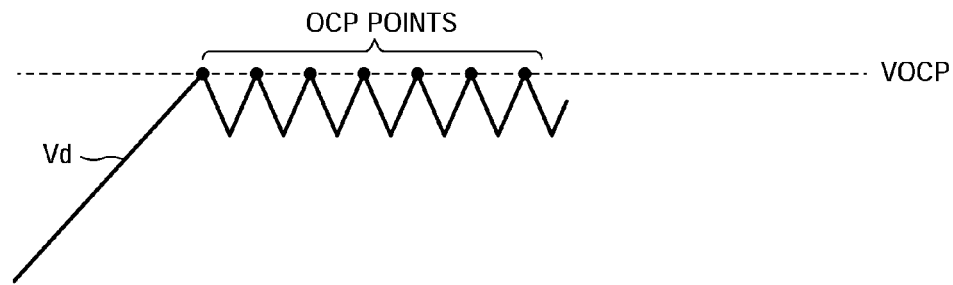
FIG. 12 is a diagram for describing a problem when the ripple converter of the first conventional example is provided with the overcurrent protection function.
Figure 13:
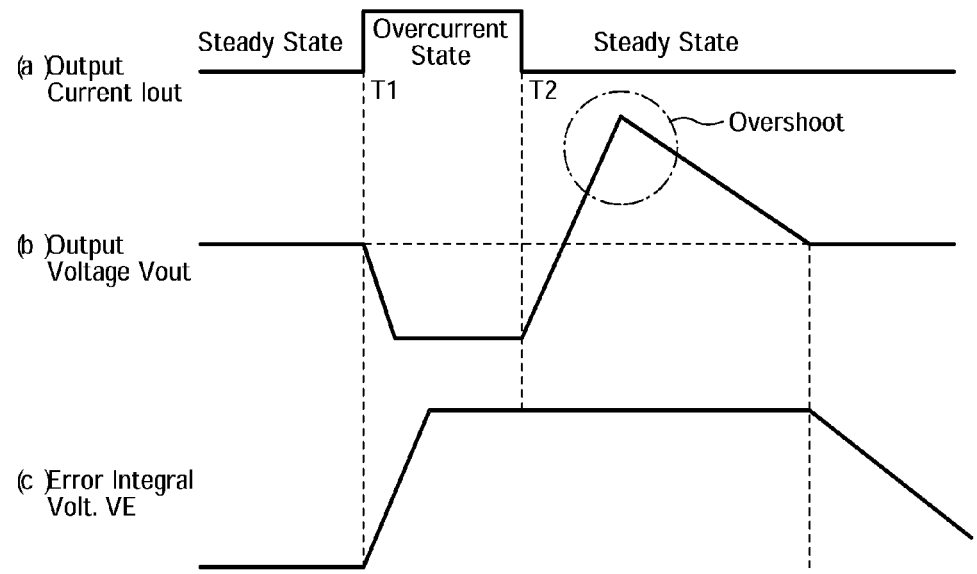
FIG. 13 is a diagram for describing a problem when the ripple converter of the second conventional example is provided with the overcurrent protection function.

That is, the levels gradually start to increase of the signal line 105 of the error integral voltage VE and of the signal line 106 of the reference voltage Vref (see FIG. 5(*c*)). The level of the output voltage Vout also starts to increase gradually (see FIG. 5(*b*)).

Therefore, since the overcurrent protection has just been released in the ripple comparator 10, while the level has been reduced of the divided voltage Vf applied to the inverting input terminal, the level has also been reduced in advance of the error integral voltage VE applied to the non-inverting input terminal. As a result, the overshoot does not occur in the switching control signal D (=VE−Vf) output from the ripple comparator 10. The level of the divided voltage Vf, i.e., the output voltage Vout gradually increases, following the increase in the level of the error integral voltage VE. Since the switching control signal D is arranged to be delayed by the delay circuit 90 and then supplied to the MOS transistors Q1, Q2, the overshoot can be constrained more reliably after the overcurrent protection is released.

Also, the level of the output voltage Vout has been reduced at the time of the overcurrent protection. Therefore, there is the possibility that immediately after the overcurrent protection is released, the ripple comparator 10 may generate the H-level switching control signal D that turns on the MOS transistor Q1 (turns off the MOS transistor Q2) to increase the level of the output voltage Vout depending on what the level of the comparison voltage of the ripple comparator 10 is. That is, although the level of the comparison voltage of the ripple comparator 10 has been reduced at the time of the overcurrent protection as described above, an overshoot may still occur in the output voltage Vout.

Therefore, when it is detected that the output current Iout is in the overcurrent state, the output correction circuit 100 has the level of the comparison voltage of the ripple comparator 10 be reduced to be lower than the predetermined level of the comparison voltage for the case of the steady state (where the MOS transistors Q1, Q2 are turned on/off normally), which is not the overcurrent state. As a result, although the MOS transistors Q1, Q2 start turning on/off normally immediately after the overcurrent protection is released, the level of the comparison voltage is lower than the normal level thereof, which voltage is compared with the divided voltage Vf and used as a target in the ripple comparator 10. Therefore, the overshoot of the output voltage Vout is certainly constrained. Such control can be realized by adjusting the resistance values of the resistance elements R3, R4 to change the discharging speed of the capacitance elements C2, C3 at the time of the overcurrent protection depending on the predetermined period of the overcurrent protection, for example.

Although the implementations of the present invention have been described as above, the aforementioned implementations are for the purpose of facilitating the understanding of the present invention and not for the purpose of construing the present invention in a limited manner. The present invention may be changed/altered without departing from the spirit thereof and encompasses the equivalents thereof.

What is claimed is:

1. A switching control circuit that is provided in a self-excited DC-DC converter chopping a direct-current input voltage by turning on/off a switching element and then smoothing the chopped voltage with a smoothing circuit to generate an output voltage of a target level that is different from the level of the input voltage, the switching control circuit comprising:

a switching control signal generation circuit that detects a change in ripples of the output voltage and generates a switching control signal for the on/off control of the switching element by comparing a feedback voltage obtained by feeding back the output voltage and a comparison voltage as a comparison target to make the output voltage follow the target level;

an overcurrent protection signal generation circuit that detects the output current of the self-excited DC-DC converter and, when it is detected that the output current is in an overcurrent state where being equal to a predetermined current or greater, generates an overcurrent protection signal for turning off the switching element to make the output current less than the predetermined current regardless of the switching control signal; and an output correction circuit that adjusts the comparison voltage according to a relative error of the feedback voltage with respect to the reference voltage to make the average level of the feedback voltage coincide with the reference voltage corresponding to the target level and, when the overcurrent protection signal generation circuit detects that the output current is in the overcurrent state, reduces the level of the comparison voltage, wherein the output correction circuit is applied with the feedback voltage and the reference voltage, generates and outputs an error integral voltage to indicate an integral of a relative error of the feedback voltage with respect to the reference voltage and to adjust the comparison voltage, and reduces the level of the error integral voltage if being in the overcurrent state is detected, wherein the overcurrent protection signal generation circuit generates and supplies a state signal indicating whether the output current is in the overcurrent state or not to the output correction circuit, wherein the output correction circuit includes:
an error amplifier that is applied with the feedback voltage and the reference voltage, the error amplifier generating a relative error current of the feedback voltage with respect to the reference voltage; and
a first capacitance element that is connected to a first signal line between the error amplifier and the switching control signal generation circuit, the first capacitance element being charged by the error current to generate the error integral voltage, and wherein the first capacitance element is charged when the state signal supplied from the overcurrent protection signal generation circuit indicates being not in the overcurrent state and the first capacitance element is discharged when the state signal indicates being in the overcurrent state.

2. The switching control circuit of claim 1, wherein when it is detected that the output current is in the overcurrent state, the output correction circuit makes the level of the comparison voltage used in the switching control signal generation circuit be reduced to be lower than a predetermined level of the comparison voltage for the case of a steady state, which is not the overcurrent state.

3. The switching control circuit of claim 1, wherein the first capacitance element is connected in parallel with a series body of a first resistance element for adjusting the discharging speed of the first capacitance element and a first switching element that switches on/off according to the state signal.

4. A switching control circuit that is provided in a self-excited DC-DC converter chopping a direct-current input voltage by turning on/off a switching element and then smoothing the chopped voltage with a smoothing circuit to generate an output voltage of a target level that is different from the level of the input voltage, the switching control circuit comprising:
- a switching control signal generation circuit that detects a change in ripples of the output voltage and generates a switching control signal for the on/off control of the switching element by comparing a feedback voltage obtained by feeding back the output voltage and a comparison voltage as a comparison target to make the output voltage follow the target level;
- an overcurrent protection signal generation circuit that detects the output current of the self-excited DC-DC converter and, when it is detected that the output current is in an overcurrent state where being equal to a predetermined current or greater, generates an overcurrent protection signal for turning off the switching element to make the output current less than the predetermined current regardless of the switching control signal; and
- an output correction circuit that adjusts the comparison voltage according to a relative error of the feedback voltage with respect to the reference voltage to make the average level of the feedback voltage coincide with the reference voltage corresponding to the target level and, when the overcurrent protection signal generation circuit detects that the output current is in the overcurrent state, reduces the level of the comparison voltage, wherein the output correction circuit is applied with the feedback voltage and the reference voltage, generates and outputs an error integral voltage to indicate an integral of a relative error of the feedback voltage with respect to the reference voltage and to adjust the comparison voltage, and reduces the level of the reference voltage if being in the overcurrent state is detected, wherein the output correction circuit includes an error amplifier that is applied with the feedback voltage and the reference voltage, the error amplifier generating a relative error current of the feedback voltage with respect to the reference voltage, and wherein a second capacitance element that is connected to a second signal line for applying the reference voltage to the error amplifier is charged when the state signal supplied from the overcurrent protection signal generation circuit indicates being not in the overcurrent state and the second capacitance element is discharged when the state signal indicates being in the overcurrent state.

5. The switching control circuit of claim 4, wherein the second capacitance element is connected in parallel with a series body of a second resistance element for adjusting the discharging speed of the second capacitance element and a second switching element that switches on/off according to the state signal.

\* \* \* \* \*